United States Patent
Balaba et al.

(10) Patent No.: US 6,228,199 B1
(45) Date of Patent: May 8, 2001

(54) SYNTHETIC WOOD

(75) Inventors: Willy M. Balaba, Monroeville; Thomas J. Bryan, III, Coraopolis, both of PA (US)

(73) Assignee: Balaba Concrete Supply, Inc., Pittsburgh, PA (US)

(*) Notice: Subject to any disclaimer, the term of this patent is extended or adjusted under 35 U.S.C. 154(b) by 0 days.

(21) Appl. No.: 09/132,092

(22) Filed: Aug. 10, 1998

(51) Int. Cl.⁷ .................................................. B32B 31/00
(52) U.S. Cl. .................. 156/161; 156/166; 156/73.5; 156/305; 156/307.1
(58) Field of Search .................. 428/299.4; 156/161, 156/166, 73.5, 305, 307.1

(56) References Cited

U.S. PATENT DOCUMENTS

| | | | |
|---|---|---|---|
| 3,662,446 | 5/1972 | Walls | 29/130 |
| 3,720,572 | 3/1973 | Soda et al. | 161/143 |
| 3,935,047 | 1/1976 | Shinomura | 156/163 |
| 3,936,518 | 2/1976 | Soda et al. | 264/45.5 |
| 4,044,185 | 8/1977 | McCaskey, Jr. et al. | 428/153 |
| 4,141,944 | 2/1979 | Anstadt et al. | 264/45.5 |
| 4,419,400 | 12/1983 | Hindersinn | 428/245 |
| 5,075,413 | 12/1991 | Dailey, Jr. | 528/129 |
| 5,075,414 | 12/1991 | Dailey, Jr. | 528/129 |
| 5,395,108 * | 3/1995 | Souders et al. | 273/72 R |
| 5,536,541 | 7/1996 | Armellini | 428/33 |
| 5,605,757 * | 2/1997 | Klett | 428/392 |

* cited by examiner

*Primary Examiner*—Elizabeth M. Cole
(74) *Attorney, Agent, or Firm*—Douglas G. Glantz

(57) ABSTRACT

A synthetic wood material and method are disclosed, including providing a plurality of continuous glass fibers oriented substantially in the longitudinal axis and coated with a resorcinol modified phenolic resin binder substantially free from catalyst. In one aspect, the synthetic wood material is oxidatively treated to restore color. In one aspect, the fibers and binder are precoated with a furfuryl alcohol resin prior to the pultrusion step to form the synthetic wood.

7 Claims, No Drawings

SYNTHETIC WOOD

BACKGROUND OF THE INVENTION

1. Technical Field

This invention relates to a synthetic wood composition, a method of preparation for forming such a synthetic wood composition, and an article made from such a synthetic wood composition. In one aspect, this invention relates to a novel synthetic wood article resistant to attack by fungi and termites and which is efficient and safe to manufacture and produce.

2. Background

Natural wood is susceptible to attack by fungi and termites. Natural wood is particularly susceptible to attack by fungi and termites, after having become seasoned, or when the wood is held in contact with moist earthen ground. The wood becomes degraded and loses important structural and decorative features that it had before breaking down from the fungi or termite attack.

Prior attempts to protect natural wood have used chemical treatments on the wood to circumvent the shortcomings of natural wood, when seasoned, to become susceptible to attack by fungi and termites. Such prior chemical treatments on the natural wood involve procedures such as wolmanizing and the like. Wolmanizing is the application of copper, chromium, and arsenic compounds under pressure to cure the wood and act as a preservative. These prior chemical treatments have environmental distaste because of the toxic nature of the chemicals used.

Another drawback of natural wood is that it remains unsuitable for applications in areas where fire proofing is desired.

Another drawback of natural wood is that defects such as knots, warps, and voids are a disadvantage aesthetically.

Another drawback of natural wood is that defects such as knots, warps, and voids degrade the mechanical properties of the wood.

INTRODUCTION TO THE INVENTION

An attempt to circumvent the degradation problems of natural wood can involve wood substitutes made using petroleum-based ingredients such as polyethylene (PE), polyethylene terephthalate (PET), polyvinyl chloride (PVC), and the like. Typically when using these petroleum-based ingredients, recycled stock is mandated by the high cost of new, never-before-used stock. Such new stock typically is not economically justified even in view of preferred resultant mechanical properties provided by the composites produced from new stock. So recycled stock is used.

However, over time, it has been found that recycled stock has a tendency to suffer creep in structural applications.

Although recycled stock formulations can be made to be resistant to fungal or termite attack, the formulations such as polyethylene (PE) and polyethylene terephthalate (PET) are not fire resistant. The recycled stock formulations such as polyethylene (PE) and polyethylene terephthalate (PET) require the expensive assistance of high additive filler loads to attain any appreciable fire proofing.

In the case of polyvinyl chloride (PVC), recycling poses environmental concerns.

Highly desirable would be a synthetic wood composition, or composite, that has the structural features and the aesthetic visual appeal of wood, but not the shortcomings of wood or its substitutes as available from the disclosures of the prior art.

Examples of synthetic compositions are disclosed in Soda et. al. U.S. Pat. Nos. 3,720,572 and 3,936,518, McCaskey, Jr., et. al. U.S. Pat. No. 4,044,185, Anstadt et. al. U.S. Pat. No. 4,141,944, and Shinomura U.S. Pat. No. 3,935,047. Although such formulations are resistant to fungal or termite attack, with the exception of PVC, these formulations are not fire resistant. They require the expensive addition of high filler loads to attain any appreciable fire proofing. Recycling of PVC poses environmental concerns.

Coupled with a tendency to creep, these formulations are unsuitable for use in structural applications.

Walls U.S. Pat. No. 3,662,446 uses a steel/fiberglass rod core shaft covered by a foamed layer. Upon exposure to cyclic weather conditions, the pores in the foamed layer act as sites of extensive frost heaving and the attendant mechanical damage to the products.

Armellini U.S. Pat. No. 5,536,541 employs materials of an indeterminate nature, and the Armellini method involves a complicated multi-step assembly.

Hindersinn U.S. Pat. No. 4,419,400 discloses pultruding glass fiber with a glycol modified phenolic resole. Handling of the resin during pultrusion exposes workers to the residual formaldehyde, which formaldehyde also would introduce unwanted porosity, as would other volatiles. Moreover, glycol modification reduces the thermal stability of the formulations, and confounding with the high peak processing temperatures, leads to enhanced porosity and, hence, frost heaving, as in Walls U.S. Pat. No. 3,662,446.

The high peak processing temperatures for the Hindersinn U.S. Pat. No. 4,419,400 formulations are necessary to achieve high line speeds, thereby to make the pultrusion process economically viable.

Phenolic laminating resins typically must use acid catalysts or high temperature post curing or both.

Phenol cures are relatively slow and must be carried out at higher temperatures.

Phenol is relatively easily dissolved and absorbed by body tissue and poses safety hazards to workers.

Formaldehyde now is labeled a carcinogen.

Dailey, Jr. U.S. Pat. Nos. 5,075,413 and 5,075,414 address some of these concerns by using resole-novolak mixtures which can be pultruded at lower (160° C.) temperatures. Owing to the physico-mechanical degradation of the fiber reinforcement at high pH (>10 pH), the Dailey, Jr. U.S. Pat. Nos. 5,075,413 and 5,075,414 are limited to low pH (<10 pH) and consequently suffer from long processing (>0.06 Hour) times.

Greatly advantageous would be a composition or composite resin system which provides a synthetic wood composition, or composite, that has the structural features and the aesthetic visual appeal of wood, but not the shortcomings of wood or its substitutes as available in the prior art and which could be produced at lower temperatures and high line speeds.

It is an object of the present invention to provide a novel composite substitute for natural wood.

It is an object of the present invention to provide a novel composite substitute for natural wood having the structural features and the aesthetic visual appeal of wood.

It is an object of the present invention to provide a novel composite substitute for natural wood which overcomes the problems associated with wood degradation.

It is an object of the present invention to provide a novel composite substitute for natural wood which overcomes the problems associated with fungal and termite attack.

It is an object of the present invention to provide a novel composite substitute for natural wood which overcomes the problems associated with the natural aesthetic defects and shortcomings of natural wood such as knots and warps.

It is an object of the present invention to provide a novel composite substitute for natural wood which is free of the non-homogeneous appearance of natural wood caused by defects.

It is an object of the present invention to provide a novel composite substitute for natural wood which provides the aesthetic characteristics of wood and the desired termite and fungal resistance while providing the fire and flame resistance of the synthetic composites.

These and other objects of the present invention will be described in the detailed description of the invention which follows. These and other objects of the present invention will become apparent to those skilled in the art from a careful review of the detailed description.

SUMMARY OF THE INVENTION

The product and process of the present invention provide a synthetic wood product and method of making, including a plurality of continuous glass fibers oriented substantially in the longitudinal axis, contacting the fibers with a resorcinol modified resin binder, and pultruding the fibers and binder into a synthetic wood article. In one aspect, the synthetic wood material is oxidatively treated to restore color. In one aspect, the fibers and binder are precoated, e.g., such as with a furfuryl alcohol resin, prior to the pultrusion step to form the synthetic wood.

DETAILED DESCRIPTION

The present invention provides a composition including fire resistant and fungal/termite resistant glass, aramid, or ceramic fibers or filaments reinforced in fire and fungal/termite resistant phenolic, furanic, or ceramic matrices.

The fibers or filaments of the present invention are processed by passing the fiber or filament component into a bath or vessel of the liquid resin binder. Then the resin impregnated filament is passed through one or more dies having an aperture opening of smaller dimension than that of the composite of the resin binder saturated filament component.

The die operates to wring out excess resin binder and to compress and form the resin binder saturated filament into the predetermined shape of the die.

The resin binder impregnated filament is pulled as a continuous strand from the pultrusion die.

The composite then can be cured with heat or other curing means.

The pultruded and cured product then can be cut into desired lengths.

When the artificial wood substitutes of the present invention are machined or cut, the nascent surface has an appearance that is lighter than the color of the longer-lived surfaces. Thus, the nascent surface of the machined or cut artificial wood substitute may be sometimes different from the color of the longer-lived surfaces. Such a different color is a disadvantage because it detracts from the quality of visual appeal of the artificial wood substitutes of the present invention.

Thus, subsequent to forming nascent surface of the artificial wood substitutes of the present invention, we have found that it is important to subject the machined surface to an oxidative treatment. Such an oxidative treatment is provided by a physical or chemical treatment. An example of such a physical oxidative treatment is flame treatment. Another example of such a physical oxidative treatment is frictional rubbing. We have found that flame treatment is particularly advantageous in restoring color. Nevertheless, other treatments such as treatment with chemical oxidants are used. Examples of suitable chemical oxidants are hydrogen peroxide or benzyl peroxide.

We have found that it is important to precoat the substrate before impregnating with resin. The precoating can be provided by a furfuryl alcohol resin. The precoating step of the process of the present invention provides for a full furfuryl alcohol interaction and full coatability of the fibers. It is an important difference that the precoating step of the process of the present invention avoids any interaction wherein the furfuryl alcohol is chemically bound into the binder network.

The present invention overcomes problems with additions of furfuryl alcohol in the resin binder wherein the furfuryl alcohol is tied up chemically in the resin binder, which limits interaction of the furfuryl alcohol with the fibers.

The precoating step provides for the ability to use the fibers of the substrate of the present invention in hostile chemical environments, high pH, and higher temperatures. The higher temperatures provide for significantly higher throughput.

Other precoating materials are provided by coating formulations possessing high thermal stability, and examples are polyimides.

The composite of the present invention is free of the natural and pest rendered defects associated with natural wood.

Preferably, the fiber or filament is a glass fiber composition, e.g., such as in one embodiment, an E glass containing low amounts of alkali, high tensile strength, and high elasticity with low elongation. The glass fibers are sized in the range of about 80 to $100 \times 10^{-5}$ inches in diameter. Bundles of the glass fibers contain a number of glass fibers in the range of about 100 to 5000.

Alternatively, other filaments can be used, e.g., such as filaments made of graphite, carbon, aramid (Kevlar), filaments of polypropylene or polyester, and combinations of these filament materials.

The resorcinol modified resin binder used in the present invention is a reaction product of a resorcinol and a phenolic resole resin. The resorcinol modified resin binder of the present invention is available in a formulation of Resorciphen-2074 made by Indespec Chemical Corporation of Pittsburgh, Pa.

The synthetic wood appearance is provided by the resin binder of the present invention and the way it is reacted. The resin binder of the present invention is processed in a way so that it is auto-catalyzed, i.e., the resin binder is allowed to react such that it is contacted with no external catalyst introduced into the resin binder stock itself. The importance of this difference is that the resin binder of the present invention will minimize darkening of the resin binder with curing.

The resorcinol modified component of the resin binder of the present invention provides a reddish hue to the finished article of the present invention in a way to simulate the appearance of wood and provide the synthetic wood article of the present invention.

Unlike prior art processes, the phenolic resin binder of the present invention is not acid catalyzed. The importance of this difference is that the resin binder of the present invention will not corrode a steel die.

Unlike prior art processes, the phenolic resin binder of the present invention does not use a basic, e.g., alkaline catalyst. The importance of this difference is that the fiber, e.g., glass fiber, of the present invention will not be weakened by the presence of the basic catalyst.

The synthetic wood of the present invention is formed by impregnating the glass fiber through a resin binder bath to impregnate the fiber glass filaments with resin binder in liquid form. The impregnated filaments then are pultruded and cured. The pultruded composite may be cut to predetermined lengths to form the synthetic wood articles of the present invention.

The synthetic wood articles of the present invention can be produced in a variety of different cross-sectional shapes, e.g., such as rectangular, flat, cylindrical, angular designs, e.g., by way of one example such as star shaped, or other designs, e.g., such as oval.

The synthetic wood articles of the present invention can be produced in a variety of finished products, e.g., such as boards, strips, tubes, rods, or sheets.

The product and process of the present invention provide a degradation resistant, strong, and light weight composite as a substitute for natural wood products.

EXAMPLE I

Glass (E) fiber obtained from Owens Corning Fiberglass Corporation in Toledo, Ohio was pultruded at 150° C. with a phenolic resin binder using a 16 inch steel die at a pulling speed of 5 inches per minute. The ensuing rods were cut to appropriate sizes for evaluation.

To assess the resistance of the composite material to fungal/termite attack, pieces were vertically partially (half) buried in Murrysville, Allegheny County, Pa. for various durations up to one year along side a moist river bed known to contain termites, using southern pine of identical dimensions as a control. After a period of one year, the pieces were dug up for visual inspection. Although they had been subjected to a time when the river overflowed its banks, followed by a severe snowy winter and a subsequent damp summer, the composite pieces were visually identical to their unburied equivalents. In contrast, the southern pine pieces had grown a white, moldy, stringy on their surfaces and lacked dimensional and mechanical integrity.

The results show that the composite materials are fungal/termite resistant and weather resistant.

EXAMPLE II

Glass (E) fiber was obtained from Owens Corning Fiberglass Corporation in Toledo, Ohio. Fibers and resorcinol modified phenolic resin binder were precoated prior to being pultruded at under 150° C. through a 16 inch die at a pulling speed of 5 inches per minute.

The precoating was a furfuryl alcohol resin.

It was found that the resulting pultruded articles were produced at high pH, i.e., greater than 10 pH, and shorter processing times, i.e., less than 0.06 hours. It was found unexpectedly that the resulting pultruded articles were substantially porosity free.

The process of the present invention forms a synthetic wood material by providing a plurality of continuous glass fibers oriented substantially in the longitudinal axis, contacting the fibers with a resorcinol modified phenolic resin binder, and pultruding the fibers and binder into a synthetic wood article.

The process of the present invention precoats the fibers and binder with a precoating resin prior to the pultruding step. The precoating resin includes furfuryl alcohol resin.

The resorcinol modified phenolic resin binder preferably is cured after the pultruding step, e.g., at a temperature of about 25° C. to 150° C. for about 0.1 to 24 hours.

The resorcinol modified phenolic resin binder preferably is auto-catalyzed.

The process of the present invention includes pultruding to produce a pultruded article produced at a pH greater than 10.

The present invention includes E-glass fibers as the substrate. In one embodiment, the fibers are composed of E glass co-mixed with carbon, aramid, or ceramic fibers, or mixtures thereof. The fibers are sized in the range of about 80-100 X 105 inches in diameter. The fibers are formed in bundles containing a number of glass fibers in the range of 100 to 5000.

The process of the present invention produces a pultruded article which is substantially porosity free.

In one aspect, the process of the present invention produces a synthetic wood material which is substantially free of the defects of knots, warps, or pores.

The synthetic wood material is formed into a pultruded cylinder, log, rectangle or square. The pultruded shape is cut into lengths of about 0.125 inches to 12 inches.

Thus, it can be seen that the present invention accomplishes all of the stated objectives.

Although the invention has been illustrated by the preceding detailed description, it is not intended to be construed as being limited to the specific preferred embodiments employed therein.

Whereas particular embodiments of the invention have been described herein above, for purposes of illustration, it will be evident to those skilled in the art that numerous variations of the details may be made without departing from the invention as defined in the appended claims.

What is claimed is:

1. A process for forming a synthetic wood material, comprising:
   (a) providing a plurality of continuous glass fibers oriented substantially in the longitudinal axis;
   (b) contacting said fibers with a resorcinol modified phenolic resin binder;
   (c) pultruding said fibers and binder into a synthetic wood article;
   (d) curing the resorcinol modified phenolic resin binder after said pultruding step, wherein said curing the resorcinol modified phenolic resin binder step is auto-catalyzed; and
   (e) oxidative treating said synthetic wood article.

2. A process for forming a synthetic wood material, comprising:
   (a) providing a plurality of continuous glass fibers oriented substantially in the longitudinal axis;
   (b) contacting said fibers with a resorcinol modified phenolic resin binder;
   (c) precoating said fibers and binder with a furfuryl alcohol resin precoating resin prior to said pultruding step;
   (d) pultruding said fibers and binder into a synthetic wood article; and
   (e) oxidative treating said synthetic wood article.

3. A process as set forth in claim 1, further comprising precoating said fibers and binder with a precoating resin prior to said pultruding step.

4. A process as set forth in claim 2, further comprising curing the resorcinol modified phenolic resin binder after said pultruding step.

5. A process as set forth in claim 4, wherein said curing the resorcinol modified phenolic resin binder step is auto-catalyzed.

6. A process as set forth in claim 3, wherein said precoating resin comprises furfuryl alcohol resin.

7. A process for forming a synthetic wood material, comprising:

(a) providing a plurality of continuous glass fibers sized in the range of about $80–100\times10^{-5}$ inches in diameter and oriented substantially in the longitudinal axis;

(b) contacting said fibers with a resorcinol modified phenolic resin binder substantially free from catalyst;

(c) precoating said fibers and binder with a furfuryl alcohol resin;

(d) passing the precoated fibers through a steel pultrusion die;

(e) curing said resorcinol modified phenolic resin binder substantially free from catalyst to form a synthetic wood material, wherein said synthetic wood material is substantially free of the defects of knots, warps, or pores;

(f) cutting said synthetic wood material in the shape of a wood board, plank, or strip; and (g) oxidative treating said synthetic wood material by flame treatment to restore color.

* * * * *